United States Patent [19]

Stefansky et al.

[11] Patent Number: 5,157,295
[45] Date of Patent: Oct. 20, 1992

[54] UNDER-THE-HUB DISK DRIVE SPIN MOTOR

[75] Inventors: Frederick M. Stefansky, Longmont; James Dunkley, Boulder, both of Colo.

[73] Assignee: Conner Peripherals, Inc., San Jose, Calif.

[21] Appl. No.: 742,207

[22] Filed: Aug. 5, 1991

Related U.S. Application Data

[63] Continuation of Ser. No. 616,742, Nov. 16, 1990, abandoned, which is a continuation of Ser. No. 301,797, Jan. 25, 1989, abandoned.

[51] Int. Cl.$^5$ .................... H02K 5/16; H02K 7/08; H02K 7/14; H02K 21/12
[52] U.S. Cl. .................... 310/90; 310/67 R; 310/156
[58] Field of Search ............... 310/67 R, 90, 268, 267, 310/46, 49 R, 156, 182, 91; 360/98.07, 99.04, 99.08, 99.09, 99.11; 384/504, 543, 544, 586

[56] References Cited

U.S. PATENT DOCUMENTS

| | | | |
|---|---|---|---|
| 4,285,016 | 8/1981 | Gilovich | 360/84 |
| 4,519,010 | 5/1985 | Elsässer et al. | 360/97 |
| 4,599,664 | 7/1986 | Schuh | 310/49 R |
| 4,604,665 | 8/1986 | Müller et al. | 360/97 |
| 4,647,803 | 3/1987 | von der Heide et al. | 310/67 R |
| 4,656,545 | 4/1987 | Kakuta | 360/98 |
| 4,658,312 | 4/1987 | Elsässer et al. | 310/156 |
| 4,713,704 | 12/1987 | Voll et al. | 360/97 |
| 4,739,203 | 4/1988 | Miyao et al. | 310/67 R |
| 4,739,425 | 4/1988 | Dierkes et al. | 360/97 |
| 4,743,995 | 5/1988 | Castle et al. | 360/98 |
| 4,760,298 | 7/1988 | Kitahara et al. | 310/67 R |
| 4,763,053 | 8/1988 | Rabe | 310/180 |
| 4,949,000 | 8/1990 | Petersen | 310/90 |

FOREIGN PATENT DOCUMENTS 0295653 11/1989 Japan .................... 310/51

*Primary Examiner*—Steven L. Stephan
*Assistant Examiner*—Clayton E. LaBalle
*Attorney, Agent, or Firm*—Fliesler, Dubb, Meyer & Lovejoy

[57] ABSTRACT

An under-the-hub spin motor for a disk drive includes a shaft having a first portion mounted to a support member an a second portion shaft having first and second bearings provided at the first and second ends thereof. A hub is supported by the first and second bearings and a disk having an inner diameter is mounted on the hub. A stator is provided on the support member so that the stator is outside of the Z-axis region between the bearings and a rotor is provided on the hub so that the rotor is concentric with the stator and so that a gap is defined between the stator and the rotor. The gap has a radius larger than the inner diameter of the disk.

9 Claims, 4 Drawing Sheets

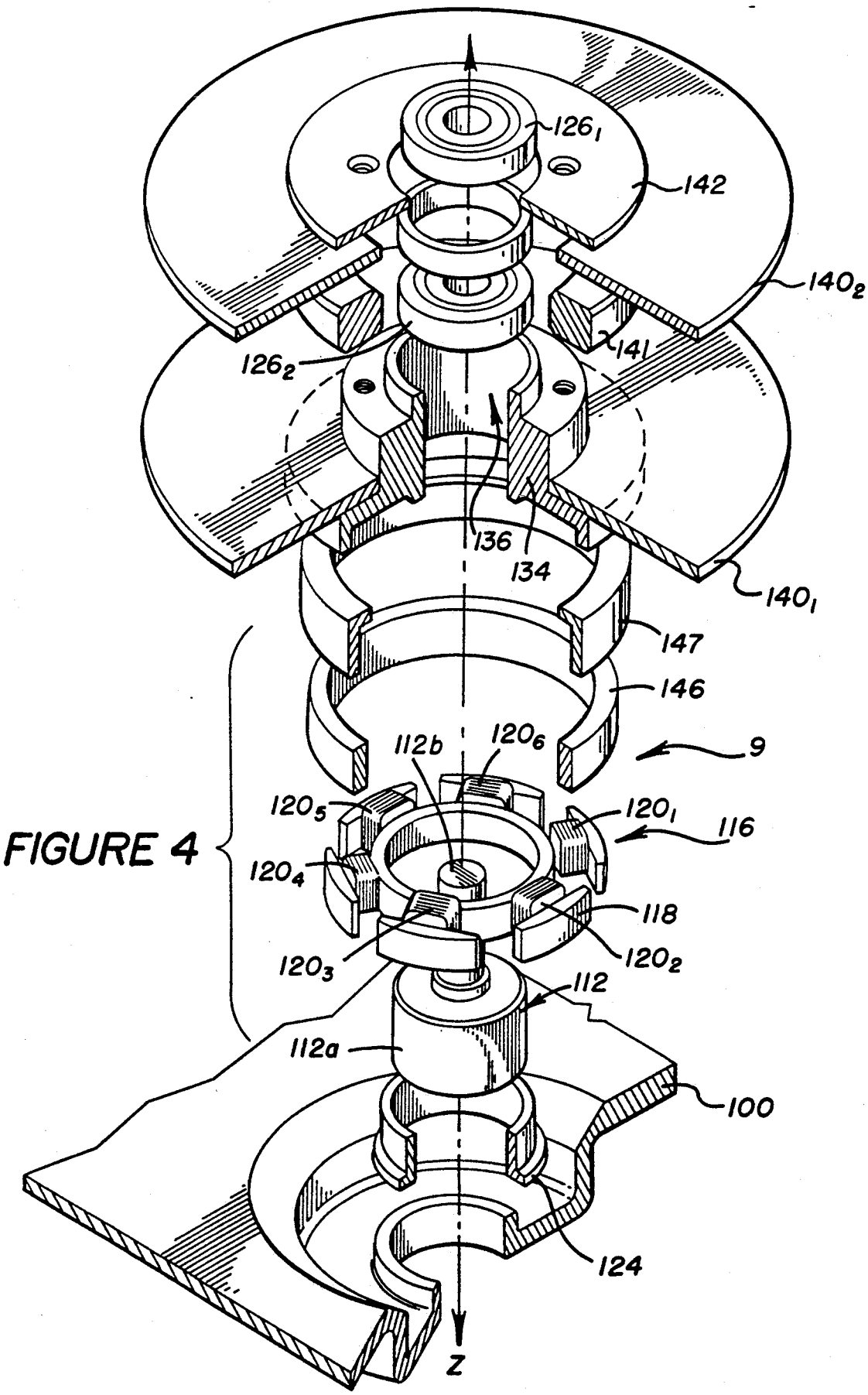

UNDER-THE-HUB DISK DRIVE SPIN MOTOR

This application is a continuation of Ser. No. 07/616,742, filed Nov. 16, 1990, abandoned, which is a continuation of Ser. No. 07/301,797, filed Jan. 25, 1989, abandoned.

CROSS-REFERENCE TO RELATED APPLICATION

METHOD AND APPARATUS FOR BRUSHLESS DC MOTOR SPEED CONTROL, Ser. No. 163,222, filed Feb. 26, 1988, inventors Squires, et al., assigned to the assignee of the subject Application.

ARCHITECTURE FOR SEALED DISK DRIVE, application Ser. No. 07/664,659, filed Mar. 5, 1991, which is a divisional of application Ser. No. 392,160, filed Aug. 8, 1989, which is a divisional of application Ser. No. 056,584, filed May 29, 1987 (now abandoned).

BACKGROUND OF THE INVENTION

1. Field of the Invention

The present invention relates to spin motors for disk drives; more particularly to low power and low height spin motors.

2. Description of the Related Art

In disk drives or (disk files) for data storage, the disks are rotated so that a transducer which is constrained to move essentially along the radius of the disk can access data at any point on each of the concentric tracks on the disk. In early disk drives, a belt connected the motor to a spindle on which the disks were mounted. Later, spin motors were integrated with the rotating shaft of the disk drive. In a rotating shaft motor, the shaft is supported by bearings mounted to the structural elements of the disk drive and the hub is fixed to the shaft (see, e.g., U.S. Pat. Nos. 4,672,487; 4,692,827; 4,703,374; and 4,739,425).

As spin motors were reduced in size, it became possible to build the spin motor into the hub. In-hub spin motors in which the stator and motor are contained within the hub are disclosed in, for example, U.S. Pat. Nos. 4,739,425 and 4,743,995. Since spin motors for disk drives are conventionally brushless motors, the armature of the motor is referred to as the stator and the magnets are referred to as the rotor. However, in a spin motor where the armature rotates and brushes are used to contact the armature, the armature would be termed the rotor and the magnets would be termed the stator. The diameter of the rotor and stator in an in-hub motor are limited by the inner diameter of the hub which is, in turn, controlled by the inner diameter of the disk or disks mounted on the hub.

The torque created by a motor is related to the product of the radius of the gap between the stator and rotor, the strength of the magnetic field created by the permanent magnets, and the length of the wire in the armature windings in the magnetic field. The torque is also related to the current in the armature windings; torque can be expressed as volts per radian per second, and volts can be expressed in terms of current In an in-hub spin motor the radius of the gap is limited by the inner diameter of the hub, and the strength of the magnetic field is limited by the characteristics of the permanent magnets. Thus, assuming a fixed magnetic field strength, increasing the torque provided by an in-hub motor, without increasing the current supplied to the motor, requires increasing the length of the armature windings in the magnetic field. The length of the armature windings in the magnetic field can be increased either by providing more windings on the stator or increasing the height of the stator lamination.

In-hub motors are well suited to multiple-disk disk drives where the height of the hub is relatively large. However, in low height disk drives, particularly disk drives intended for use in portable and/or lap-top computers, the height of the disk drive is a critical factor and in-hub motors have not been designed which meet the torque and overall height requirements. In particular, a disk drive having an overall height of approximately one inch or less must utilize a spin motor having a height of less than one inch which creates the torque necessary to provide stable operating speeds and avoids unnecessary spindowns. It has been difficult to construct motors meeting these requirements using an in-hub design.

SUMMARY OF THE INVENTION

It is, therefore, an object of the present invention to provide a low height spin motor for a disk drive which creates torque sufficient to provide stable operating speeds.

A further object of the present invention is to provide a low height spin motor in which the stator and the rotor are outside of the hub so that the radius of the stator/rotor gap may be greater than the inside diameter of the disk or disks.

Another object of the present invention is to provide and under-the-hub spin motor in which the bearings are adjacent to one another and the stator and rotor are cantilevered with respect to the positions of the bearings along the axis of the shaft.

Another object of the present invention is to provide an under-the-hub spin motor in which the center of mass of the rotating elements of the disk drive along the axis of the shaft is centered between the positions of the bearings.

Another object of the present invention is to provide an under-the-hub disk drive in which the shaft is directly mounted to the base of a disk drive, thereby eliminating the interface between a flange and the base plate.

Another object of the present invention is to provide a spin motor having sufficient space inside the spin motor to provide a large number of turns of large diameter wire on the armature windings.

Another object of the present invention is to provide a low power spin motor which operates at 5 volts to eliminate the need for an additional 12-volt power supply in a computer—the electronics operate from a 5-volt power supply.

A spin motor for rotating a disk in a disk drive having a base plate, the disk having a mounting hole having a first diameter, in accordance with a first embodiment of the present invention comprises a flange mounted on the base plate, a shaft having a first and second portions and an axis, said first portion of said shaft being mounted to said flange, first and second bearings provided at respective first and second positions on said second portion of said shaft, a hub, rotatably supported on said shaft by said first and second bearings, said hub having a bearing contact surface having a second diameter and a disk support surface which is substantially perpendicular to the axis of said shaft for supporting the disk, a stator provided on the flange, said stator including a stator lamination having a third diameter greater than the second diameter, and a rotor mounted on said hub.

A spin motor for rotating a disk in a disk drive including a base plate, the disk having a mounting hole having a diameter, in accordance with a second embodiment of the present invention comprises a shaft having a first and second portions and an axis, said first portion of said shaft being mounted directly to said base plate, first and second bearings provided at respective first and second positions on said second portion of said shaft, a hub, rotatably supported on said shaft by said first and second bearings, said hub having a center of mass at a point on the axis of said shaft equidistant from the positions of said first and second bearings, a bearing contact surface having a second diameter, an outer wall having a third diameter which is less than the first diameter, and a disk support surface which is substantially perpendicular to the axis of said shaft for supporting the disk, a stator provided on the base plate, said stator including a lamination having a third diameter greater than the second diameter, and a rotor mounted on said hub.

BRIEF DESCRIPTION OF THE DRAWINGS

FIG. 4 is an exploded view of an under-the-hub disk drive spin motor in accordance with the second embodiment of the present invention.

DESCRIPTION OF THE PREFERRED EMBODIMENTS

Under-the-hub spin motors in accordance with the first and second embodiments of the present invention will be described will reference to FIGS. 1–4. Spin motors in accordance with the present invention may be brushless DC motors operated in accordance with the method disclosed in co-pending application Ser. No. 163,222, which is hereby incorporated by reference. However, the principles of the present invention are applicable to motors utilizing brushes—although such motors are usually not desirable in disk drives—and to rotors in which either the armature or magnets rotate.

Figure 1:
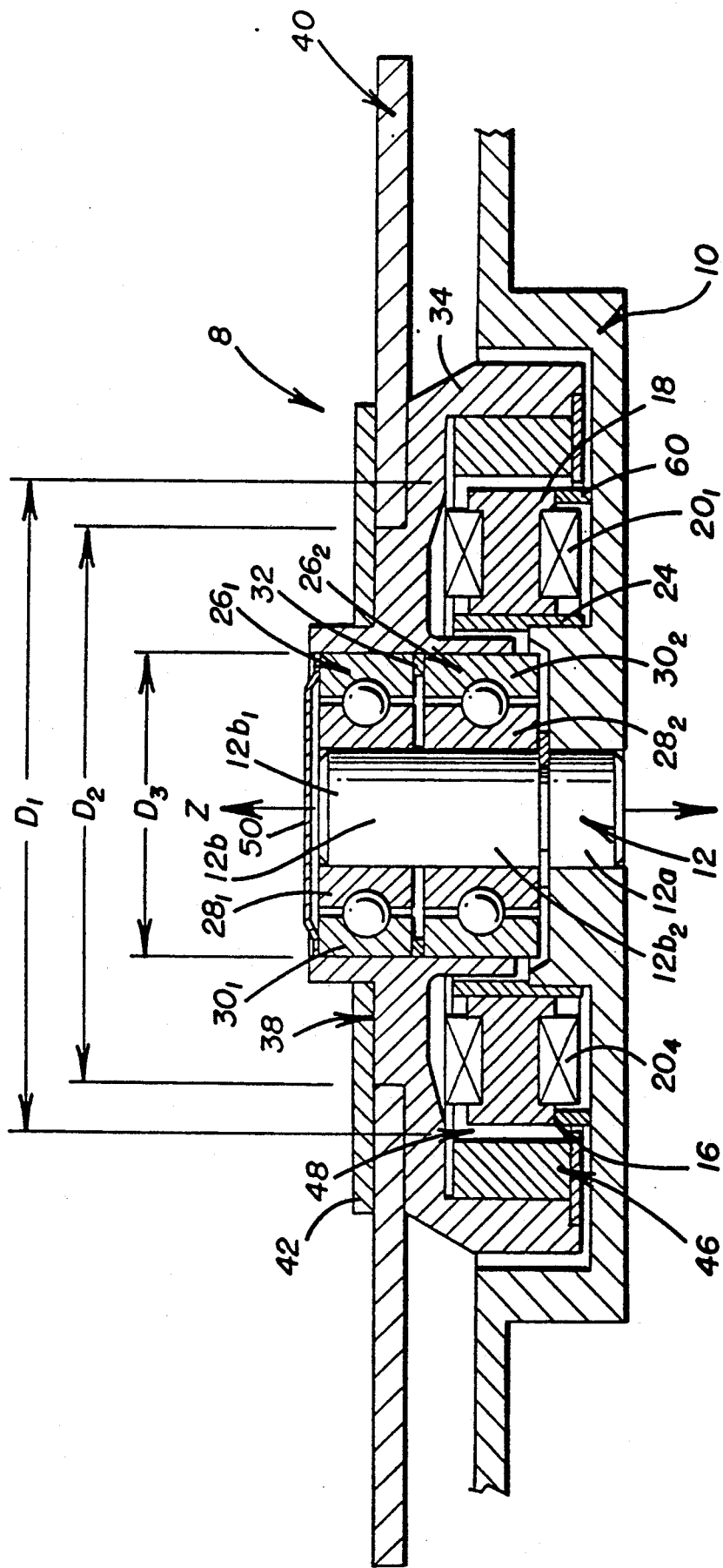
FIG. 1 is a sectional view of an under-the-hub disk drive spin motor in accordance with the first embodiment of the present invention.
Figure 2:
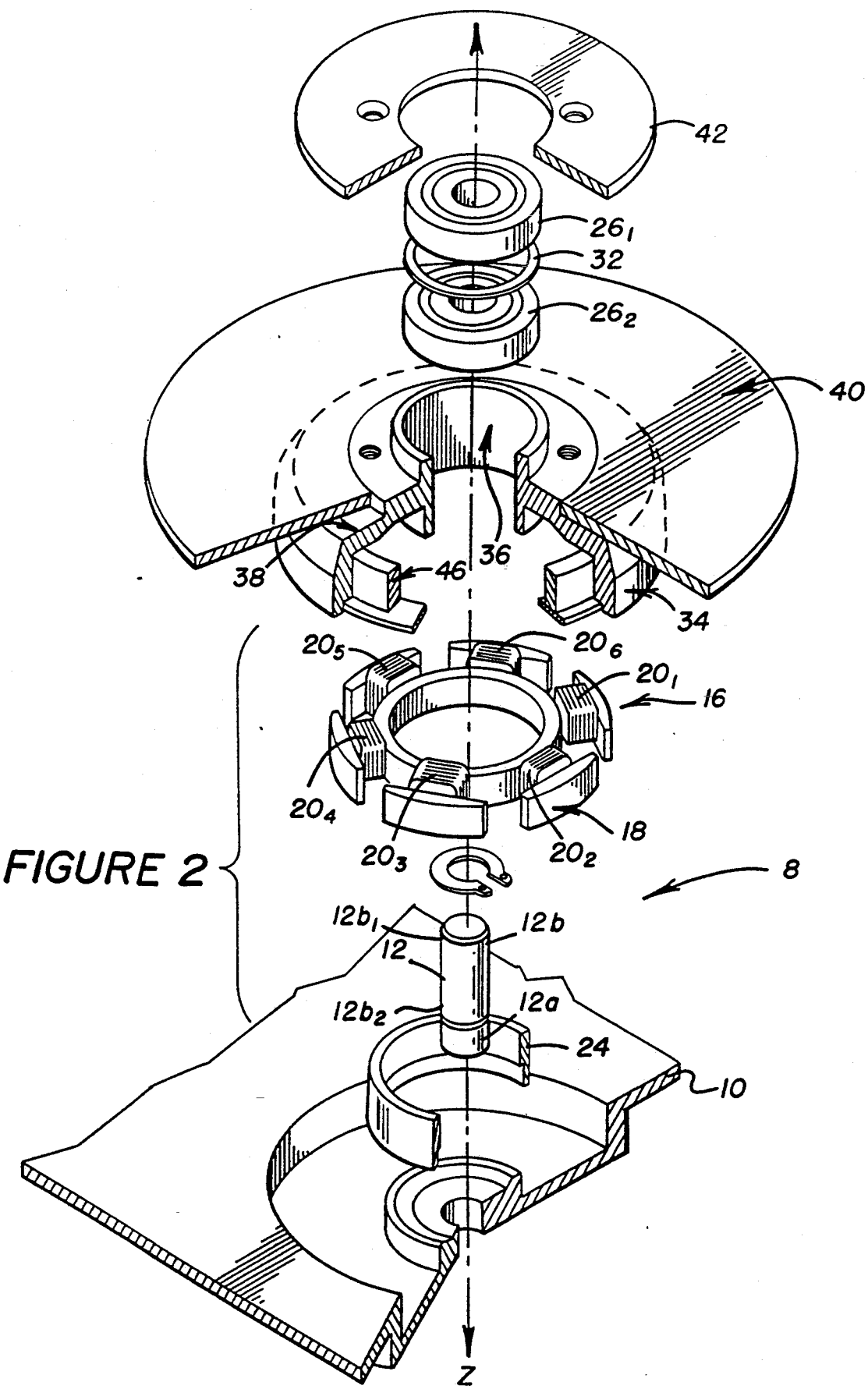
FIG. 2 is an exploded view of the under-the-hub disk drive spin motor in accordance with the first embodiment of the present invention.

An under-the-hub spin motor 8 in accordance with the first embodiment of the present invention is illustrated in and will be described with reference to FIGS. 1 and 2. The spin motor 8 of the first embodiment of the present invention is a stationary shaft motor in which a flange 10 rigidly supports motor shaft 12. Spin motor 8 is attached to a disk drive by mounting flange 10 on the base plate (not shown) of the disk drive. A stator assembly 16, including a stator lamination 18 and a plurality of coils $20_{1-6}$ provided on stator lamination 18, is mounted on a collar 24 provided on flange 10. Flange 10, shaft 12, and stator 16 comprise the stationary portion of spin motor 8.

Shaft 12 has a first portion 12a which mates with flange 10 and a second portion 12b. First and second bearings $26_{1-2}$ are respectively provided on first and second ends $12b_1$, $12b_2$ of the second portion of 12b of shaft 12. The inner races $28_{1-2}$ of bearings $26_{1-2}$ are glued to the second portion 2b of shaft 12 in a preloading process described below. Outer races $30_{1-2}$ of bearings $26_{1-2}$ are separated by a spacer 32.

Hub 34 has an inner bearing surface 36 which mates with outer races $30_{1-2}$ so that hub 34 is supported by and rotates on bearings $26_{1-2}$. A disk support surface 38 provided on hub 34 is oriented so that the axis Z of shaft 12 is normal to the plane of disk support surface 38. Disk 40 rests on disk support surface 38 and is held in place by a retainer 42 which is attached to hub 34 by, for example, screws (not shown).

A rotor 46, comprising a multi-pole magnetic ring, is mounted on hub 34 so that rotor 46 is concentric with stator 16 and defines a gap 48 between stator 16 and rotor 46. Gap 48 has a diameter $D_1$ which is greater than the inside diameter $D_2$ of disk 40. Diameter $D_2$ is, in turn, greater than the diameter $D_3$ of inner bearing surface 36 of hub 34.

The under-the-hub design and the overlap of stator 16 and second bearing $26_2$, provides spin motor 8 with an overall height along axis Z which is less than the total height of bearings $26_{1-2}$ and stator 16. The overlap and concentric relationship of stator 16 and second bearing $26_2$ aids in reducing the height of motor 8.

Spin motor 8 is not hermetically sealed, although spin motors having a hermetic seal could be fabricated in accordance with the present invention, and relies on a cap 50 to control the flow of air through the motor. Without such a cap, spin motor 8 would pump air through the motor, enhancing the possibility that contaminants from the motor would enter the controlled environment within the disk drive. To reduce the likelihood of contamination, bearings $26_{1-2}$ are sealed bearings and a labyrinth is formed between second bearing $26_2$ and the disk drive environment—the labyrinth has a path weaving around stator 16 and rotor 46.

Figure 3:
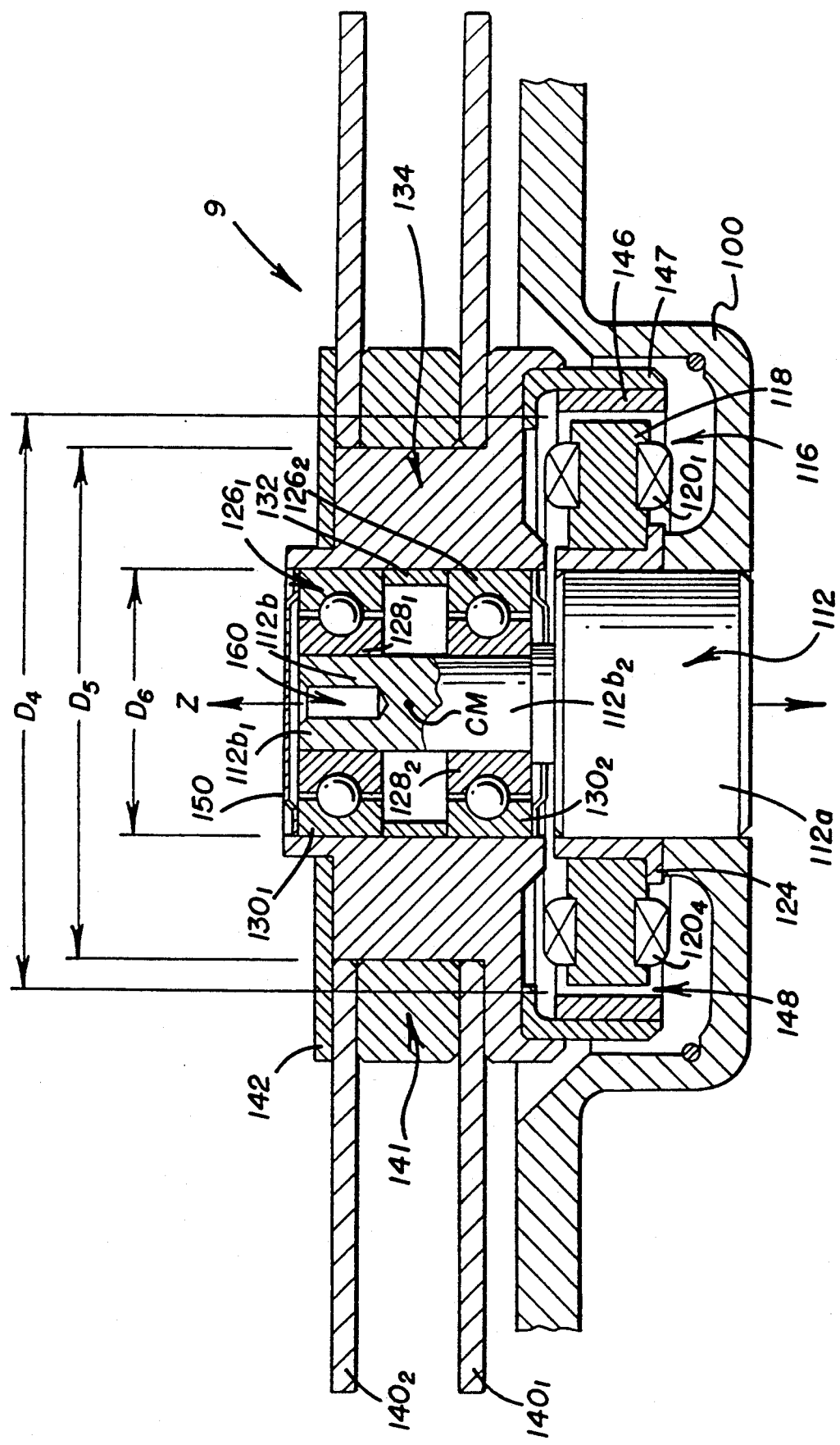
FIG. 3 is a sectional view of an under-the-hub disk drive spin motor in accordance with the second embodiment of the present invention.

An under-the-hub spin motor 9 in accordance with the second embodiment of the present invention is illustrated in FIGS. 3 and 4. The spin motor of the second embodiment of the spin motor is also a stationary shaft motor. Spin motor 9 is attached to a disk drive by directly mounting a first portion 112a of shaft 112 to base plate 100 of the disk drive. To provide greater stability, first portion 112a of shaft 112 has a larger diameter than second portion 112b of shaft 112. The direct mounting of shaft 112 to the base plate eliminates one interface; whereas the first embodiment of the present invention has two interfaces (an interface between shaft 12 and flange 10 and an interface between flange 10 and the base plate) the second embodiment has only a single interface (the interface between shaft 2 and the base plate. Further, the direct mounting allows base plate 100 to act as a heat sink for spin motor 9.

A stator assembly 116, including a stator lamination 118 and a plurality of coils $120_{1-6}$ provided on stator lamination 118, is mounted on a collar 124 which surrounds a first portion 112a of shaft 112 and abuts base plate 100. In a spin motor 9 the use of two disks $140_{1-2}$ does not allow for an overlap of stator 116 and second bearing $126_2$. Shaft 112, and stator 116 comprise the stationary portion of spin motor 9.

First and second bearings $126_{1-2}$ are respectively provided on first and second ends $112b_1$, $112b_2$ of the second portion of $112b$ of shaft 112. The inner races $128_{1-2}$ of bearings $126_{1-2}$ are glued to the shaft 112 in a preloading process described below. Outer races $130_{1-2}$ of bearings $126_{1-2}$, which are separated by a spacer 132, support a hub 134 by contacting inner bearing surface 136 of hub 134.

The rotating elements of motor 9 comprise a hub assembly based on hub 34. Hub 134 has a disk support surface 138 which supports disk $140_1$, a second disk $140_2$ is separated from first disk $140_1$ by a spacer 141. As in the first embodiment, disk support surface 138 is oriented so that the axis Z of shaft 112 is normal to the plane of disk support surface 138. Disks $140_{1-2}$ are retained by retainer 142 attached to hub 134 by, for example screws (not shown).

Hub 134 is formed of aluminum to match the thermal expansion coefficients of thermal expansion of hub 134 and disks $140_{1-2}$. Differences in these coefficients could cause the disks $140_{1-2}$ to change position relative to hub 134 as the disks and the hub undergo thermal cycles. Further, in an aluminum hub 134 a bearing sleeve may be provided as an integral portion of hub 134, whereas a steel hub would require a bearing sleeve press-fit into the hub.

A rotor 146, comprising a multi-pole magnetic ring, is mounted on hub 134 by rotor collar 147. Rotor 146 is concentric with stator 16 and defines a gap 148 between stator 116 and rotor 146. As in the first embodiment, gap 148 has a diameter $D_4$ which is greater than the inside diameter $D_5$ of disks $140_{1-2}$, and diameter $D_5$ is, in turn, greater than the diameter $D_6$ of inner bearing surface 136 of hub 134.

A cap 150 attached to hub 134 and a labyrinth, similar to that of motor 8 of the first embodiment, prevent air from freely flowing through motor 9.

The under-the-hub design of motors 8, 9 provides a large gap diameter $D_4$, and thus a large gap radius $D_4/2$, which causes under-the-hub spin motors 8, 9 to generate more torque than in-hub motors having the same number of turns in windings $20_{1-2}$ $120_{1-6}$ and magnets providing the same field strength as magnets 46, 146 in rotors 46, 146, and using the same operating current as motors 8, 9. Further, since the torque produced by spin motors 8, 9 is also related to the current in windings $20_{1-6}$, $120_{1-6}$ spin motors 8, 9 can produce the same amount of torque as an in-hub motor having the same size windings and the same type magnet using a smaller current. The reduction in the current is important in reducing the heat produced by the motor and reducing the power required by the spin motor, and thus the overall power required by the disk drive incorporating spin motor 8 or 9.

The under-the-hub design also provides space inside the motor for a larger number of turns in each of windings $20_{1-6}$, $120_{1-6}$ allowing the use of larger diameter wire in windings $20_{1-6}$, $120_{1-6}$. A large number of turns is desired in order to generate the highest possible back EMF, and larger wire reduces the resistance in windings $20_{1-6}$, $120_{1-6}$ allowing the motors 8, 9 to operate at a lower voltage, for example 5 volts as opposed to the conventional operating voltage of 12 volts. For example, spin motor 9 has 70 turns of 36 gauge (0.0056" diameter) wire per winding $120_{1-6}$. Operated at 12 volts and 3600 rpm this motor produces a back EMF of 9 volts.

Preloading bearings $26_{1-2}$ and $126_{1-2}$ is performed by placing the bearings on the shaft with the appropriate spacing between outer races $30_{1-2}$, $130_{1-2}$, and then using a mechanical device to force the inner races $28_{1-2}$, $128_{1-2}$ towards one another with a carefully calibrated and constant force and maintaining this force while an adhesive used to attach bearings to the shaft cures. In spin motor 9, a threaded hole 160 is provided at the first end $112b_1$ of first portion $112b$ of shaft 112 so that a preloading tool may be attached shaft 112.

The many features and advantages of the spin motors of the first and second embodiments of the present invention will be apparent to those skilled in the art from the DESCRIPTION OF THE PREFERRED EMBODIMENTS. Thus, the following claims are intended to cover all modifications and equivalents falling within the scope of the invention.

What is claimed is:

1. An under-the-hub spin motor for rotating a disk in a disk drive having a base plate, the disk including a mounting hole having a first diameter, comprising:
   a shaft having a first and second portions, and an axis, said first portion of said shaft being supported by the base plate;
   first and second bearings provided at respective first and second positions relative to said axis at first and second ends of said second portion of said shaft, said bearings spaced apart by a third portion occupying a third position, between said first and second positions, relative to said axis;
   a hub, rotatably supported on said shaft by said first and second bearings, said hub having a disk support surface which is substantially perpendicular to the axis of said shaft for supporting the disk;
   a stator assembly provided on said base plate and positioned at a position relative to the axis of the shaft outside of an axial region which includes said first, second, and third positions; and
   a rotor mounted on said hub so that said rotor is concentric with said stator, said stator and said rotor defining a gap therebetween, the position of said gap defining a diameter greater than the first diameter of the mounting hole of the disk.

2. An under-the-hub spin motor for rotating a disk in a disk drive having a base plate, said base plate having a top and bottom, the disk including a mounting hole having a first diameter, comprising:
   a shaft having a first and second portions and an axis, said first portion of said shaft being supported by the base plate, said first portion of said shaft having a first diameter and said second portion of said shaft having a second diameter, said second diameter being less than said first diameter;
   first and second bearings provided at respective, adjacent first and second positions on said second portion of said shaft, said bearings being separated by a spacer, said spacer provided at a third position relative to said shaft;
   a hub, rotatably supported on said shaft by said first and second bearings, said hub having a disk support surface substantially perpendicular to the axis of said shaft for supporting the disk;
   a stator assembly provided on the top of said base plate and positioned at a fourth position relative to said shaft nonoverlapping said first, second and third positions, wherein said base plate defines a plane substantially perpendicular to said axis and said stator is positioned below said plane; and
   a rotor mounted on said hub so that said rotor is concentric with said stator, said stator and said rotor defining a gap therebetween, the position of said gap defining a diameter greater than the first diameter of the mounting hole of the disk.

3. An under-the-hub spin motor for rotating a disk in a disk drive having a base plate, the base plate defining a plane and including a recessed portion, the disk including a mounting hole having a first diameter, comprising:

a shaft having a first and second portions and an axis, said first portion of said shaft having a diameter and being mounted in said recessed portion of the base plate, said second portion of said shaft having a diameter less than the diameter of said first portion;

first and second bearings provided at respective first and second positions on said second portion of said shaft above the plane defined by the base plate;

a hub, rotatably supported on said shaft by said first and second bearings, said hub including a bearing contact surface having a second diameter and a disk support surface which is substantially perpendicular to the axis of said shaft for supporting the disk;

a stator provided in said recessed portion, said stator including a stator lamination having a third diameter greater than the first diameter, said stator being positioned at a third position relative to the axis of the shaft non-overlapping the axial region which includes the positions of said first and second bearings such that said stator is below the plane defined by the base plate; and a rotor mounted on said hub, at least a portion of said rotor being cantilevered outside of the axial region between the positions of said first and second bearings.

4. A spin motor according to claim 3, wherein said rotor comprises a multi-pole magnetic ring provided on said hub and concentric with said stator.

5. A spin motor according to claim 4, wherein said first and second bearings are preloaded.

6. A spin motor for rotating a disk in a disk drive including a base plate having a top and a bottom, the disk including a mounting hole having a first diameter, comprising:

a shaft having a first and second portions and an axis, said first portion of said shaft being mounted directly into a portion of the base plate and having a first diameter, said second portion of said shaft having first and second ends in the axial direction and a diameter less than said first diameter;

first and second bearings provided, respectively, at said first and second ends of said second portion of said shaft;

a hub, rotatably supported on said shaft by said first and second bearings, said hub having a center of mass located at a point on the axis of said shaft between the positions of said first and second bearings, a cylindrical bearing contact surface having a second diameter, and a disk support surface which is substantially perpendicular to the axis of said shaft for supporting the disk;

a stator provided on the base plate so that a portion of said stator is concentric with said first portion of said shaft and positioned below a plane, said plane being normal to said axis and defined by the top base plate, said stator including a lamination having a third diameter greater than the first diameter; and a rotor mounted on said hub, so that a portion of said rotor is cantilevered with respect to said bearings and concentric with said first portion of said shaft.

7. A spin motor according to claim 6, wherein said entire rotor is cantilevered with respect to said first and second bearings and concentric with said first portion of said shaft.

8. A spin motor according to claim 7, wherein said first and second bearings are provided at respective, adjacent first and second positions.

9. A spin motor according to claim 1 wherein said base plate defines a plane substantially perpendicular to said axis and includes a recessed portion, and said stator is positioned below said plane.

* * * * *